Nov. 21, 1939.  J. STASTNY  2,180,558
COUPLING PIN
Filed April 11, 1938   2 Sheets-Sheet 1

Inventor
John Stastny
By Clarence A. O'Brien
Hyman Berman
Attorneys

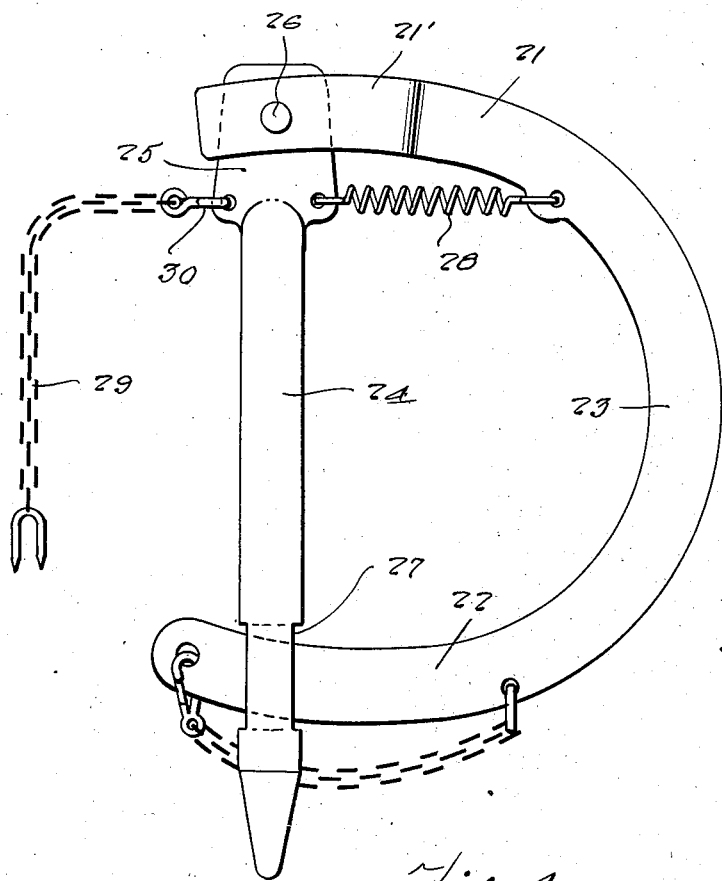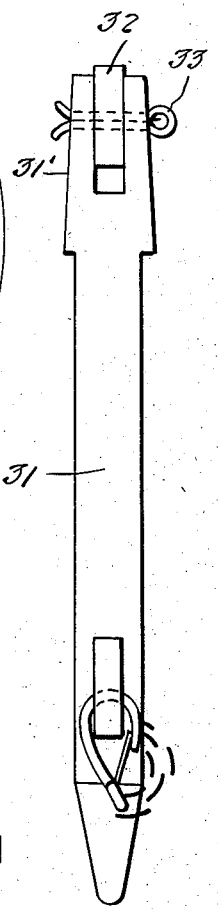

Patented Nov. 21, 1939

2,180,558

UNITED STATES PATENT OFFICE 2,180,558

COUPLING PIN

John Stasiny, Rogers, Tex.

Application April 11, 1938, Serial No. 201,450

1 Claim. (Cl. 280—33.15)

My invention relates to improvements in coupling pins for use more particularly in coupling trailer hitches together, although as will presently clearly appear, it is adapted for use in connection with other couplings of various other vehicles.

The object of the invention is to provide an inexpensive device of this character which may be readily inserted through apertured parts designed to be coupled together and easily and securely locked in position against pulling or vibrating out of location.

To the accomplishment of the foregoing, and subordinate objects presently appearing, a preferred embodiment of my invention, and one modification thereof, have been illustrated in the accompanying drawings, set forth in detail in the following description, and defined in the claim appended hereto.

Figure 1:
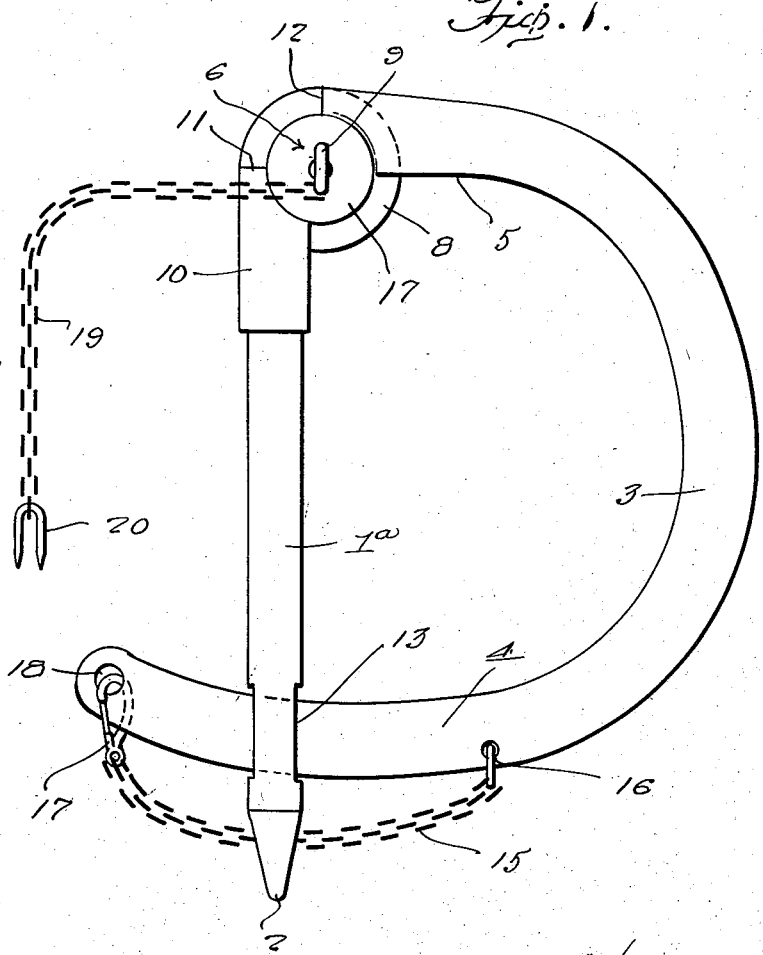
Figure 2:
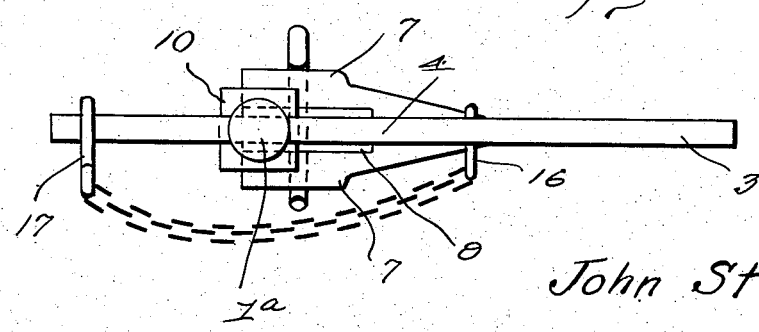

In said drawings:

Figure 1 is a view in side elevation of the preferred embodiment of my invention, Figure 2 is a view in bottom plan, Figure 3 is a view in side elevation of a modified form of the invention, Figure 4 is a view in top plan of said modified form, and Figure 5 is a view in front elevation of another modified form of the invention.

Referring to the drawings by numerals, in the preferred embodiment thereof, the pin of my invention comprises a straight coupling member 1, preferably round, and having a pointed free end 2 for ready insertion through the usual coupling members, and a bowed latch member 3, of flat metal, having a long leg 4 and a short leg 5 to which the other end of the coupling member 1 is pivoted by a rule type joint 6 swingably connecting the members 1 and 3 together for relative movement in a common plane. The joint 6 comprises a pair of laterally spaced rounded ears 7 on said short leg 5, a similar ear 8 on the member 1 fitting between the ears 7 and a cotter pin 9 extending through said ears. Adjacent the ear 8, the member 1 is of increased diameter to provide a reinforcing portion 10 which forms a shoulder 11 adapted to abut the end of the short leg 5 when the member 1 is aligned with said leg. Adjacent its free end 2, the member 1 has formed therein a longitudinally extending through slot 13 through which the long leg 4 of the member 3 is adapted to be inserted, when the member 1 is located in the coupling, to prevent said member 1 from being withdrawn. The long leg 4 of the member 3 is equipped with means for preventing the same from pulling out of the slot 13 in the form of a short length of chain 15 having one end attached by a link 16 to said leg 4 and its other end equipped with a snap hook 17 adapted to be inserted into an aperture 18 at the end of the short leg 5, the link 16 being connected to the short leg 5 on the side of the member 1 opposite the aperture 18, whereby said chain 15 is looped around the end 2 of the member 1 and the leg 5 thereby prevented from being pulled out of the slot 13 unless the snap hook 17 is disconnected. To prevent the device from being lost or misplaced a chain 19 is secured at one end in any suitable manner to the cotter pin 9 and provided on its other end with a staple 20 to be driven into a suitable part of the trailer and thereby anchor the device thereto.

As will be understood, when it is desired to detach the described pin, the snap hook 17 is unhooked from the long leg 4 of the member 3 whereupon said member may be swung on the joint 6 to withdraw the long leg 4 from the slot 13 of member 1 and thereby unlatch the same for removal when desired.

In the modified form of the invention shown in Figures 3 and 4, the legs 21 and 22 of the latch member 23 are of substantially equal length and in lieu of the rule joint 6, the coupling member 24 is provided with an enlarged flat end 25 pivoted, as by means of a pin 26, in a bifurcated extremity 21' on one leg 21. Also the latch member 23 is urged in a direction to enter the appropriate leg 22 in the slot 27 of the member 24 by means of a tension spring 28 having its opposite ends suitably secured to said member 23 and to the enlargement 25 of the member 24. An anchoring chain 29 similar to chain 19 is connected to the enlarged end 25 by a link 30. Otherwise the arrangement is the same as described with reference to the preferred form of the invention.

In the modified form of the invention shown in Figure 5 the coupling member 31 is bifurcated, as at 31', to receive one leg 32 of the latch member therebetween and a cotter pin 33 is inserted through said bifurcations and said end of the member.

My invention will, it is believed, be clearly understood from the foregoing without further explanation.

Manifestly the invention is susceptible of modification, in other respects than described, and right is herein reserved to such modifications as fall within the scope of the subjoined claim.

What I claim is:

A coupling device of the class described comprising a coupling pin having a head at its upper end and said pin having a slot adjacent its lower end, a substantially C-shaped member having its upper end pivoted to the head with its lower end passing through the slot, said lower end being longer than the upper end and said lower end entering the slot when the parts are in a neutral position, a chain having one end connected to the lower part of the C-shaped member an appreciable distance from the end of said lower part and means for detachably connecting the other end of the chain to said end of the lower part, said chain forming a loop around the lower end of the coupling pin, and a spring connecting the upper part of the C-shaped member to the head of the pin and tending to hold the lower part of the C-shaped member in position passing through the slot of the coupling pin.

JOHN STASTNY.